United States Patent [19]

Sudduth et al.

[11] 4,104,146

[45] Aug. 1, 1978

[54] PROCESS FOR THE PURIFICATION OF GAS STREAMS

[75] Inventors: Jerome R. Sudduth, Pasadena; Donald A. Keyworth, Houston, both of Tex.

[73] Assignee: Tenneco Chemicals, Inc., Saddle Brook, N.J.

[21] Appl. No.: 592,563

[22] Filed: Jul. 2, 1975

[51] Int. Cl.$^2$ .................. B01K 1/00; B01D 53/34
[52] U.S. Cl. ................... 204/165; 423/240; 423/245
[58] Field of Search ................ 204/165; 423/245

[56] References Cited

U.S. PATENT DOCUMENTS

| | | | |
|---|---|---|---|
| 3,421,930 | 1/1969 | Knox et al. | 204/170 X |
| 3,875,034 | 4/1975 | Adams et al. | 204/165 |
| 3,933,980 | 1/1976 | Smalheiser | 423/245 |

*Primary Examiner*—F.C. Edmundson
*Attorney, Agent, or Firm*—Evelyn Berlow

[57] ABSTRACT

Gas streams that contain from about 10 ppm to 1000 ppm of vinyl chloride are purified by passing them through a zone of silent electric discharge. This treatment destroys at least 80%, and in most cases 90% or more, of the vinyl chloride in the gas stream.

4 Claims, No Drawings

PROCESS FOR THE PURIFICATION OF GAS STREAMS

This invention relates to a process for the purification of gas streams. More particularly, it relates to a process for the removal of vinyl chloride from gas streams that contain from about 10 ppm to 1000 ppm of vinyl chloride.

When vinyl chloride is polymerized in an aqueous medium by suspension or emulsion polymerization techniques, there is obtained a latex or slurry that contains polyvinyl chloride and up to about 5% by weight of vinyl chloride. Most of the unreacted monomer is usually removed by heating the latex or slurry under reduced pressure to about 65° C. This stripping process produces large volumes of gases that contain low concentrations of vinyl chloride.

In view of the recently-developed safety standards that require that the amount of vinyl chloride in the atmosphere that workers breathe be maintained at very low levels, it is necessary that the vinyl chloride in the effluent gas stream be recovered or destroyed so that these requirements can be met.

A number of procedures have been proposed for the removal of vinyl chloride from gas streams that contain a low concentration of vinyl chloride, but none has proven to be entirely satisfactory. Procedures that involve its adsorption on activated carbon effectively remove vinyl chloride from gas streams, but carbon has limited capacity for the adsorption of vinyl chloride, and when the carbon has adsorbed from about 5% to 20% by weight of vinyl chloride, it is saturated and must be regenerated. The activated carbon gradually loses its ability to adsorb vinyl chloride and must be replaced by fresh activated carbon at frequent intervals. Vinyl chloride and other compounds that are desorbed from the surface of the carbon must be recycled to the process or destroyed. Among the chemical methods that have been proposed for the destruction of vinyl chloride in gas streams is reaction with ozone. This method has the disadvantage of being slow and requiring long residence times to reduce the vinyl chloride content of the gas stream to 1 ppm or less. In addition, it is difficult to meter ozone into the gas streams in amounts that will destroy substantially all of the vinyl chloride without leaving an appreciable amount of ozone in the effluent gas. There are also environmental problems arising from the presence in the effluent gas of ozonides formed by the reaction of vinyl chloride with ozone.

In accordance with this invention, it has been found that the vinyl chloride content of gas streams that contain from about 10 ppm to 1000 ppm of vinyl chloride can be substantially reduced by passing the gas stream through an silent electric discharge zone. This treatment quickly reduces the vinyl chloride content of the gas stream to the desired level without adding sizeable amounts of ozone, ozonides, or other noxious compounds to it.

The process of this invention can be carried out in any apparatus in which large volumes of gas can be passed through an silent electric discharge zone. It is preferably carried out in ozone-generating apparatus. The construction and operation of several types of ozonators that can be used in the practice of the invention are described in the article entitled "Ozone" by T. C. Manley and S. J. Niegowski in Kirk-Othmer's "Encyclopedia of Chemical Technology", second edition, volume 14, pages 421–426.

The gas streams that can be passed through the ozonator or other apparatus having a zone of silent electric discharge to reduce their vinyl chloride contents may be air streams, other oxygen-containing gas streams, or gas streams that are substantially free of oxygen.

When air or an other oxygen-containing gas is passed through the silent electric discharge zone, the ozone which is produced assists in the removal of vinyl chloride from the gas streams. To prevent the formation of such ozone reaction products as hydrogen peroxide and nitric acid, the oxygen-containing gas is dried before it is passed through the silent electric discharge zone.

In a preferred embodiment of the invention, air or another oxygen-containing gas stream that contains from 10 ppm to 1000 ppm of vinyl chloride is dried and then passed through an ozonator. As the gas stream passes through the silent electric discharge zone, its vinyl chloride content is reduced by at least 80%, and some of the oxygen in it is converted to ozone. For a short period after the emergence of the gas stream from the ozonator, the vinyl chloride content of the gas stream continues to fall as the result of the reaction between the vinyl chloride and ozone in the gas stream. About 5 to 10 minutes after the gas stream has emerged from the ozonator, its vinyl chloride content is usualy less than 10% of that of the gas stream entering the ozonator.

When the gas stream that is to be purified by the process of this invention is substantially free of oxygen, it is passed through the silent electric discharge zone at such a rate that at least 90%, and preferably 95% or more of the vinyl chloride is destroyed. Since these gas streams do not contain ozone, there is no further reduction in their vinyl chloride content after they leave the zone of silent electric discharge.

In each case, the gas flow rate that will produce the desired reduction in the vinyl chloride content of the gas stream is dependent upon such factors as the size of the silent electric discharge zone, the vinyl chloride content of the gas, and the amount of oxygen that is in the gas. The optimum flow rate may readily be determined for each gas stream and for each ozonator or other apparatus having an silent electric discharge zone.

The invention is further illustrated by the following examples.

EXAMPLE 1

A. An ozone generator that was used to remove vinyl chloride from gas streams consisted of a Tesla coil sealed with high melting wax into a 2-cm. diameter glass tube that was 33 cm. long. The tip of the Tesla coil was fitted with a coil leading to a straight center wire traversing the length of the glass tube. The exterior of this generator tube was wrapped with metal foil and grounded to accomodate the electric discharge. An inlet tube was fitted into the base of the generator tube, and an exit tube led the excited gases into a reaction zone, which was an 8 mm. diameter glass tube that was 70 cm. long. A rotometer was used to monitor gas flow rates.

At a gas flow rate of 0.5 liter per minute, the residence time of the gas in the generator zone was 12.5 seconds and its superficial velocity was 2.67 cm./sec. At this flow rate, the residence time of the gas in the reactor zone was 4.4 seconds and its superficial velocity was 16.6 cm./sec.

B. An air stream that contained 282 parts by weight of vinyl chloride per million parts by weight of air was passed through the ozonator described above at rates ranging from 0.33 liter per minute to 1.0 liter per minute. One hundred milliliters of the effluent gas was collected in a 100 ml. gas sample syringe and transported to a gas chromatographic analyzer where 20 ml. aliquots of the gas sample were analyzed at various times after the emergence of the gas from the ozonator. The results obtained are set forth in Table I.

Table I

Removal of Vinyl Chloride from Air Containing 282 ppm of Vinyl Chloride by Passing the Air Through a Silent Electric Discharge Zone

| Gas Flow Rate (liter/min.) | Concentration of Ozone in Gas at Emergence from Ozonator (ppm) | Time After Emergence from Ozonator (minutes) | Concentration of Vinyl Chloride in Gas (ppm) | % Vinyl Chloride Destroyed |
|---|---|---|---|---|
| 0.33 | 1479 | 1 | 2 | 99.3 |
|  |  | 3 | 1.2 | 99.6 |
|  |  | 5 | 0.8 | 99.7 |
|  |  | 7 | 0.5 | 99.8 |
|  |  | 9 | 0.3 | 99.9 |
| 0.50 | 1220 | 1 | 14 | 95.0 |
|  |  | 3 | 8 | 97.2 |
|  |  | 5 | 5 | 98.2 |
|  |  | 7 | 3 | 98.9 |
|  |  | 9 | 2 | 99.3 |
| 0.75 | 1952 | 1 | 36 | 87.2 |
|  |  | 3 | 21 | 92.6 |
|  |  | 5 | 13 | 95.4 |
|  |  | 7 | 9 | 96.8 |
|  |  | 9 | 6 | 97.9 |
| 1.0 | 1464 | 1 | 53 | 81.2 |
|  |  | 3 | 32 | 88.7 |
|  |  | 5 | 21 | 92.6 |
|  |  | 7 | 14 | 95.0 |
|  |  | 9 | 10 | 96.5 |

From the data in Table I, it will be seen that at each of the flow rates used, the vinyl chloride content of the gas stream was reduced by 80% or more by passing the gas stream through the silent electric discharge zone. The vinyl chloride content of the gas stream was further reduced by the reaction of the residual vinyl chloride with ozone. Nine minutes after the emergence of the gas streams from the ozonator, their vinyl chloride contents had been reduced by 96.5% to 99.9%, based on their vinyl chloride content (282 ppm) when they entered the ozonator.

COMPARATIVE EXAMPLE A

Fifty milliliters of air containing 282 ppm of vinyl chloride was mixed with 50 ml. of air that contained 1400 mole percent of ozone. The gas mixture was analyzed at various times after mixing to determine the amount of vinyl chloride that had been destroyed by the ozone. The results obtained are set forth in Table II.

Table II

Reaction of Vinyl Chloride and Ozone in Absence of Silent Electric Discharge

| Time After Mixing (Minutes) | Concentration of Vinyl Chloride in Gas (ppm) | % Vinyl Chloride Destroyed |
|---|---|---|
| 1 | 117 | 17 |
| 3 | 68 | 52 |
| 5 | 43 | 70 |
| 7 | 33 | 77 |

A comparison of the data in Table II with that in Table I shows that the vinyl chloride in the air stream was destroyed far more rapidly when it passed through an silent electric discharge zone.

EXAMPLE 2

A blend of 353 ppm of vinyl chloride in nitrogen was passed through the ozonator described in Example 1A at the rate of 0.5 liter per minute. The gas emerging from the ozonator was collected and analyzed by the procedures described in Example 1B. The results obtained are set forth in Table III.

From the data in Table I and Table III, it will be seen that the removal of vinyl chloride from a nitrogen stream is even faster than its removal from an air stream when the gas streams are passed through a zone of silent electric discharge. After the nitrogen stream has emerged from the silent electric discharge zone, however, there is no further decrease in its vinyl chloride content.

After the passage of the nitrogen stream through the ozonator, a small amount of a tan deposit was found on the inner surface of the ozonator. This deposit was found by mass spectroscopy to be a mixture of polymers containing =NH groups. These polymers were not formed when air was passed through the ozonator.

Table III

Removal of Vinyl Chloride from Nitrogen Originally Containing 353 ppm of Vinyl Chloride by Exposing the Gas to Silent Electric Discharge

| Gas Flow Rate (liter/min.) | Time After Emergence from Ozonator (minutes) | Concentration of Vinyl Chloride in Gas (ppm) | % Vinyl Chloride Destroyed |
|---|---|---|---|
| 0.33 | 1 | 1.7 | 99.2 |
|  | 3 | 1.0 | 99.6 |
|  | 5 | 1.8 | 99.2 |
|  | 7 | 2.6 | 98.9 |
|  | 9 | 1.8 | 99.2 |
| 0.55 | 1 | 8 | 96.4 |
|  | 3 | 7 | 96.9 |
|  | 5 | 8 | 96.4 |
|  | 7 | 10 | 95.5 |
|  | 9 | 12 | 94.6 |
| 0.75 | 1 | 14 | 93.7 |
|  | 3 | 14 | 93.7 |
|  | 5 | 14 | 93.7 |
|  | 7 | 15 | 93.7 |
|  | 9 | 15 | 93.7 |
| 1.0 | 1 | 30 | 86.5 |
|  | 3 | 30 | 86.5 |
|  | 5 | 30 | 86.5 |
|  | 7 | 30 | 86.5 |
|  | 9 | 30 | 86.5 |

What is claimed is:

1. The process for the removal of vinyl chloride from a gas stream that contains from about 10 ppm to 1000 ppm of vinyl chloride and substantially no oxygen that comprises passing said gas stream through a silent electric discharge zone at such a rate that at least 80% of the vinyl chloride in the gas stream is destroyed.

2. The process of claim 1 wherein the gas stream is passed through the silent electric discharge zone at such a rate that at least 90% of the vinyl chloride in the gas stream is destroyed.

3. The process of claim 1 wherein the gas stream is passed through the silent electric discharge zone at such a rate that at least 95% of the vinyl chloride in the gas stream is destroyed.

4. The process of claim 1 wherein the gas stream leaving the silent electric discharge zone contains not more than 10 ppm of vinyl chloride.

* * * * *